United States Patent
Blackwood et al.

(10) Patent No.: US 7,603,918 B2
(45) Date of Patent: Oct. 20, 2009

(54) APPARATUS AND METHOD FOR MEASURING TORQUE AND POWER

(76) Inventors: Taylor Blackwood, 2984 N. Weatherby Cove, Germantown, TN (US) 38139;
Jason Blackwood, 2984 N. Weatherby Cove, Germantown, TN (US) 38139

( * ) Notice: Subject to any disclaimer, the term of this patent is extended or adjusted under 35 U.S.C. 154(b) by 149 days.

(21) Appl. No.: 11/864,019

(22) Filed: Sep. 28, 2007

(65) Prior Publication Data
US 2008/0078253 A1    Apr. 3, 2008

Related U.S. Application Data

(60) Provisional application No. 60/847,806, filed on Sep. 28, 2006.

(51) Int. Cl.
*G01D 1/00* (2006.01)
(52) U.S. Cl. .................................. 73/862.23
(58) Field of Classification Search ............ 73/862.23; 148/567; 464/111
See application file for complete search history.

(56) References Cited

U.S. PATENT DOCUMENTS

| | | | |
|---|---|---|---|
| 2,949,029 A | 8/1960 | Bayles et al. | |
| 3,201,982 A | 8/1965 | Kennedy | |
| 3,251,223 A | 5/1966 | Barg | |
| 3,336,795 A | 8/1967 | Arakawa | |
| 3,545,265 A | 12/1970 | McIlraith et al. | |
| 3,797,305 A | 3/1974 | Haskell | |
| 3,850,030 A | 11/1974 | Adler | |
| 3,950,986 A | 4/1976 | Parkinson | |
| 4,100,794 A | 7/1978 | Meixner | |
| 4,157,658 A | 6/1979 | Grice, Jr. | |
| 4,306,462 A | 12/1981 | Meixner | |
| 4,479,390 A | 10/1984 | Meixner | |
| 5,705,757 A | 1/1998 | Wozniak | |
| 5,837,909 A | 11/1998 | Bill et al. | |
| 6,797,084 B2 * | 9/2004 | Shuster et al. | 148/567 |
| 6,881,151 B1 * | 4/2005 | Jantz et al. | 464/14 |

OTHER PUBLICATIONS

LightTruck Quality Products; Drive Shaft Parts; website http://www.lighttruck.com/driveshaft_parts.asp. (printed Sep. 24, 2007).

* cited by examiner

*Primary Examiner*—Jewel Thompson
(74) *Attorney, Agent, or Firm*—Baker Donelson Bearman Caldwell & Berkowitz PC

(57) ABSTRACT

A torque measuring apparatus having a pressure sensor attached to a journal of a U-joint that interconnects members of a drive shaft to sense pressure during rotational operation of the drive shaft and an analyzer that receives a signal representative of the pressure, an rpm signal representative of the engine speed, and a signal representative of the speed of the vehicle, to determine a torque value that is displayed on a display device. A method of determining motor vehicle torque is disclosed.

18 Claims, 3 Drawing Sheets

APPARATUS AND METHOD FOR MEASURING TORQUE AND POWER

The present application claims priority to provisional patent application Ser. No. 60/847,806, filed Sep. 28, 2006.

TECHNICAL FIELD

The present invention relates to apparatus and methods for real-time measuring of torque and power of motor vehicles. More particularly described, the present invention relates to a U-joint configured for measuring torque and power of a motor vehicle which measured values are reported on a display observable by the operator of the motor vehicle.

BACKGROUND OF THE INVENTION

Motor sports enthusiasts and participants in motor racing often have interest in knowing the power output of an engine that operates the motor vehicle. To achieve higher performance, modifications to the motor vehicle and particularly to engines can be made. These modifications include using high performance spark plugs, spark plug wires, superchargers, and with computerized engines replacement computer modules that are "tuned" to enhance performance or that allow "tuning" to the operating characteristics of the particular engine of interest.

There are various mechanisms for determining power output of an engine. A chassis dynameter involves a static test of the motor vehicle. The motor vehicle is secured with ties to restrain the motor vehicle from moving and the drive wheels are positioned on rollers. As the engine operates across its RPM (revolutions per minute) range, monitoring equipment measures the loading on the rollers and determines the power output of the engine. This type of test provides a reasonable estimate of the power output under loading. Another test device requires removal of the engine from the motor vehicle and mounting to a test frame. The engine is operated and measurements taken to evaluate performance across the RPM range.

While these tests provide a basis for evaluating engine performance and particularly for evaluating the effect of changes to the engine on performance, there are limitations for these tests. Particularly, the tests are static—that is, the motor vehicle is not experiencing real time operating stresses and loads incurred during a road race or vehicle movement. Other mechanical components of the motor vehicle affect engine performance. For example, tire conditions, such as tread, temperature, and air pressure, can affect engine performance. Monitoring the performance of an engine can provide an indication of tire slippage during racing and thus an indication of need to pit and change tires. However, apparatus for the real-time testing of engine performance during motor vehicle moving operation has not been satisfactory for other than professional or serious enthusiasts due to costs and installation needs.

Accordingly, there is a need in the art for an improved apparatus and method for real-time measuring and reporting of torque and power of motor vehicles. It is to such that the present invention is directed.

SUMMARY OF THE INVENTION

The present invention meets the need in the art by providing a torque transfer and measuring apparatus that readily installs in a drive train of a motor vehicle, comprising a universal joint adapted for interconnecting adjacent elongated members of a drive shaft of a motor vehicle and having at least a first journal and an opposing second journal, with a pressure sensor attached to the first journal to sense pressure applied to the first journal during rotational operation of the drive shaft. An analyzer configured to receive a signal representative of the pressure sensed by the pressure sensor, an rpm signal representative of the speed of the engine, and a speed signal representative of the speed of the vehicle determines a torque value representative of a torque of the engine. A display device displays the determined torque value.

In another aspect, the present invention provides a method of determining torque of a motor vehicle, comprising the steps of:

(a) attaching a pressure sensor to at least one journal of a universal joint adapted for interconnecting adjacent elongated members of a drive shaft of a motor;

(b) communicating a signal to an analyzer representative of a pressure sensed by a pressure sensor during rotational operation of the drive shaft;

(c) communicating to the analyzer an rpm signal representative of the speed of the engine and a speed signal representative of the speed of the vehicle;

(d) determining a torque value representative of a torque of the engine; and (e) displaying the determined torque value.

Objects, advantages, and features of the present invention will become readily apparent upon reading the following detailed description in conjunction with the drawings and the appended claims.

DETAILED DESCRIPTION

Figure 1:
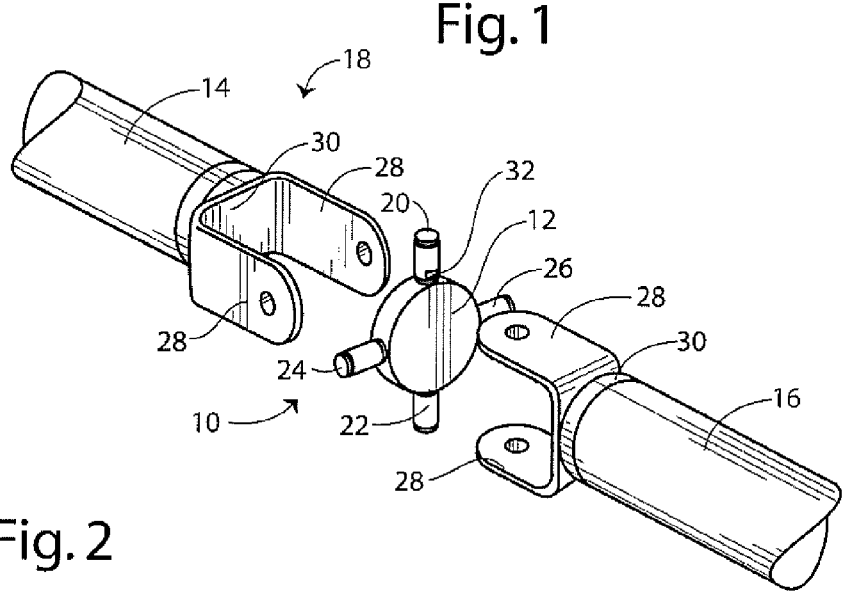
FIG. 1 illustrates a universal joint of a drive train of a motor vehicle configured with a torque measuring apparatus that communicates a torque value to a display according to the present invention.

With reference to the drawings, in which like parts have like reference numerals, FIG. 1 illustrates a first embodiment of a torque determining and display apparatus generally 10 configured in a universal joint or U-joint 12 installed in-line to connect elongated, rigid members 14, 16, such as drive shafts, of a drive train generally 18 such as that operated by an engine of a motor vehicle through a transmission. The universal joint 12 includes two pairs of opposing journals 20, 22 and 24, 26 (see FIG. 3) that conventionally interconnect to respective lugs 28 of a yoke 30 attached to the respective members 14, 16 of the drive train 18.

Figure 2:
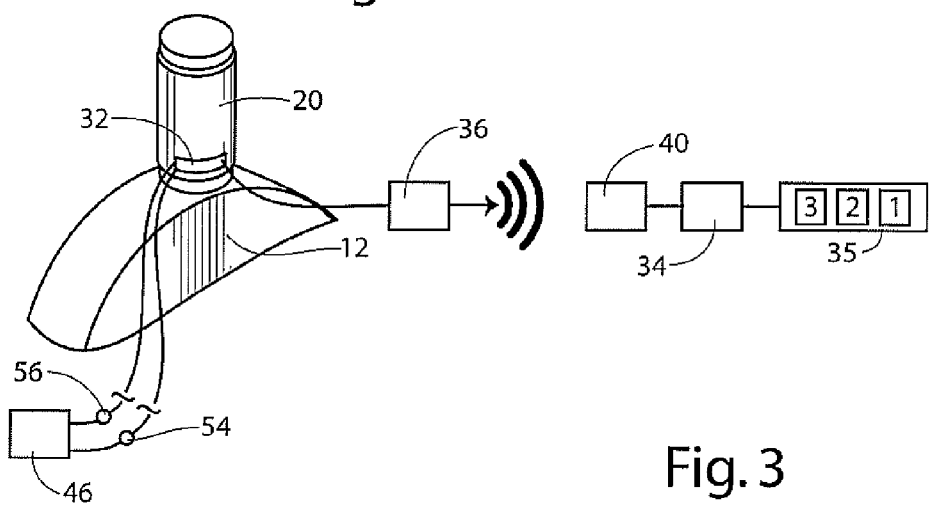
FIG. 2 illustrates in a schematic diagram the apparatus for measuring torque of a motor vehicle in accordance with the present invention.

In the first embodiment illustrated in FIG. 2, a pressure sensor 32 attaches to the journal 20. The pressure sensor 32 measures the pressure applied to the journal 20 during rotation of the drive train 18. A signal representative of the pressure sensed by the pressure sensor 32 communicates to an analyzer or microprocessor controller 34. The controller 34 also receives a signal representative of the rotational speed of the engine operating the drive shaft, such as a signal lead from a tachometer operatively coupled to the engine conventionally. The controller 34 is configured to determine a torque value based on the pressure signal and the speed signal. The controller 34 communicates the determined torque value to a display 35 that mounts to a dashboard of the motor vehicle for observation by a driver of the motor vehicle during operation of the motor vehicle.

In the illustrated embodiment, the controller 34 is remote from the pressure sensor 32. The pressure sensor 32 communicates the sensed pressure as a signal to a transmitter 36. The transmitter 36 and a power supply such as a battery, mount to an opposing journal to balance the U-joint 12. The battery supplies electrical current for the pressure sensor and the transmitter. The transmitter 36 emits a wireless signal 38 reflective of the pressure signal sensed by the pressure sensor 32. A receiver 40 receives the wireless signal 38 and communicates the signal to the controller 34.

Figure 3:
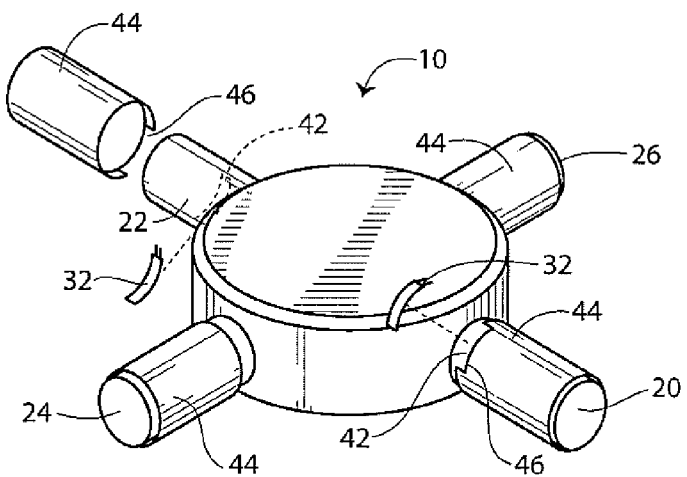
FIG. 3 illustrates in detailed exploded perspective view a second embodiment of a U-joint configured with pressure sensors for measuring pressures representative of a torque of a drive chain of a motor vehicle.

FIG. 3 illustrates in detailed exploded perspective view a second embodiment in which opposing journals 20, 22 each include on the drive side of the journal an arcuate recess 42 that receives one of the pressure sensors 32. The journals slidingly receive a shim collar or cap 44 to provide bearing surface for the journals of the drive train 18. The shim collars 44 for the journals having the pressure sensors 32 include a notch 46 for exposing the pressure sensors 32.

In the illustrated embodiment, the recess 42 in the journals 20, 22 are machined to have a depth of 0.008 inches across an arcuate portion of the journal. The recess 42 receives the pressure sensor 32 that is adhered in place to the journal. The pressure sensor is a thin flexible pressure sensor such as an I-SCAN type available from Tekscan, Inc. of Boston, Mass. The pressure sensor 32 measures the pounds of pressure applied to the universal joint.

As discussed with reference to FIG. 2 and below with reference to FIG. 4, the pressure sensor 32 connects to the transmitter 34. The transmitter 34 communicates with potentiometers and a battery. The potentiometers enable selectively setting the variable reference voltage and the variable input voltage. The input voltage adjusts the range of horsepower detected by the pressure sensor. The reference voltage is used to establish the output signal. The greater the pressure exerted on the journal 20 of the universal joint 12, the lower the amount of current flows through the sensor. Specifications provided by the manufacturer of the pressure sensor correlate the input voltages and the range of horsepower that is determinable. The battery leads connect to a power source such as batteries, which may include conventional AA 1.5 volt batteries, a 9-V battery, or other power supply source.

Once the pressure sensor 32 is in secured within the machined recess 42 of the journal 20, 22, the bearing cap 44 slides over the journal. In an alternate embodiment th bearing cap 44 cooperatively secures the pressure sensor 32 to the journal.

Figure 4:
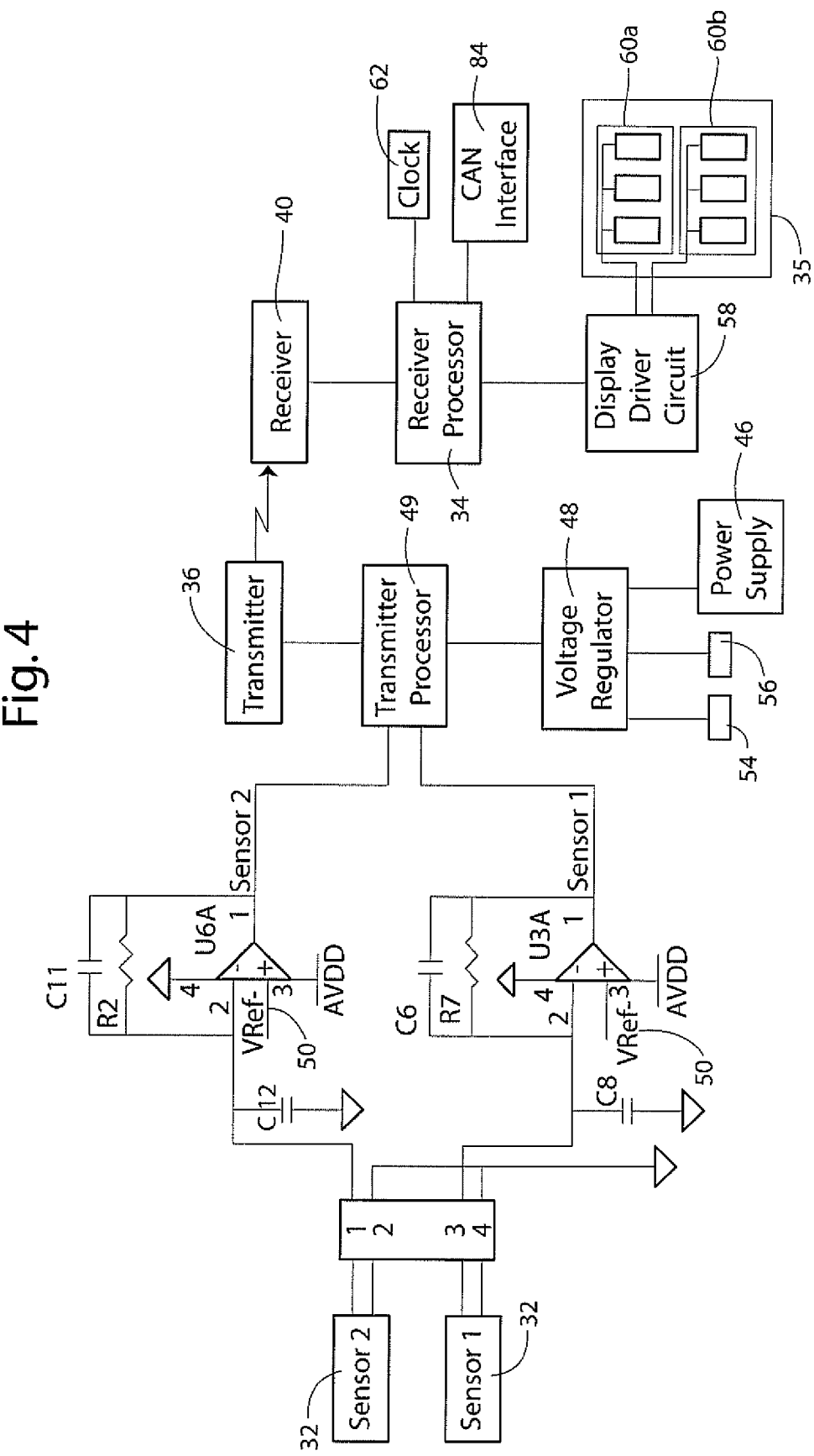
FIG. 4 illustrates in a schematic diagram the torque measuring and display apparatus according to the present invention.

FIG. 4 illustrates in a schematic diagram the torque measuring and display apparatus according to the present invention. The pressure sensors 32 communicate with a source of electricity, such as a battery 46, through a voltage regulator 48. The voltage regulator 48 provides electrical supply to a transmitter microprocessor 49 and provides the pressure sensors 32 with a reference voltage 50 and a range voltage. The range voltage sets the range of the pressure sensed by the pressure sensor 32, and thus, sets the range of the horsepower to be determined by the controller 34. The pressure sensor 32 detects pressure applied to the journal 20. The pressure sensor 32 is configured for reducing the flow of current through the pressure sensor in response to pressure applied to the journal 20 during operation of the drive train 18. In the illustrated embodiment, a pair of potentiometers 54, 56 communicate with the voltage regulator 48, and are selectively adjustable to set the range voltage and the input reference voltage 46.

The receiver 40 communicates with the analyzer or microprocessor control 34. The analyzer also includes a display driver circuit 58 that operates conventional 7-segment displays 60a, 60b for display of the torque and horsepower. The analyzer 34 is governed by a clock or oscillator 62. In the illustrated embodiment, the analyzer 34 also communicates through an interface with a conventional information or data bus 64 in the motor vehicle that receives signals representative of the speed of the motor vehicle, the engine speed (rpm), and other motor vehicle operation information. This information or data is available upon query by the analyzer 34. Motor vehicles commonly have OBD II, or similar, links that use a conventional communications protocol for commutating motor vehicle operational data via a common data bus, such as using a CAN (Controlled Area Network) interface and protocol. The analyzer 34 is configured to query the on-board computer or data bus for the engine speed and motor vehicle speed. The analyzer then determines the torque and the horsepower for display.

Figure 5:
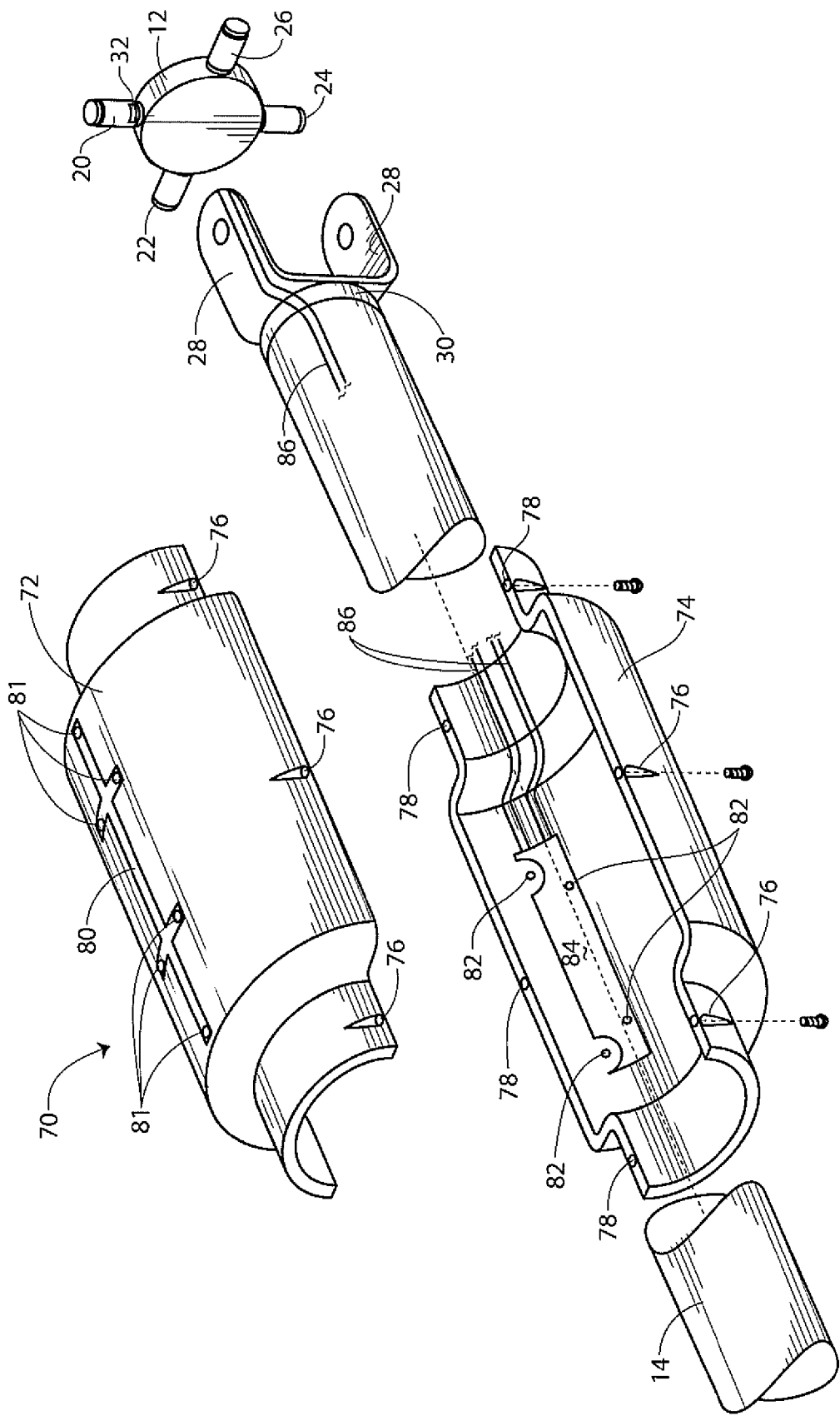
FIG. 5 illustrates in perspective view a casing that mounts around a drive shaft to enclose a transmitter and power supply adjacent the U-joint.

FIG. 5 illustrates in perspective view a casing 70 that mounts around the shaft 14 to enclose the transmitter circuitry including the voltage regulator 48, the processor 49, and the transmitter 36, together with the power supply 46, adjacent the U-joint 12. The casing 70 is clam-shell with opposing mating housings 72, 74. The housings 72, 74 define spaced-apart slotted recesses 76 and openings 78 for receiving threaded fasteners for connecting the opposing housings 72,74 together about the shaft 14. Each housing 72, 74 includes a removable cover 80 (having fasteners 81) to a recess that holds batteries to power the pressure sensors 32 and the transmitter circuitry. An interior surface includes projecting posts 82 to which a circuit board 84 attaches. The circuit board 84 includes the transmitter 36, the processor 49, and the voltage regulator 48. The circuit board 84 communicates with the pressure transducers 28 and with the batteries held in the recess. Arcuate opposed distal ends of the shell can include resilient sealing material (not illustrated) to seal the interior of the casing 70 from weather elements. Wires generally 86 between the circuit board 84 and the pressure sensors 32 pass along and attach to the shaft 14 and the yoke 30.

The receiver 406 together with its controller 34 and the display 35 mount to the dashboard of the motor vehicle, or other suitable mount, so that the display is observable by the driver.

Transmitter Circuit

Microprocessor: PIC18F2585 (Microchip Technology Incorporated, Chandler, Ariz.)

Transmitter: Xbee (Maxstream, Inc., Lindon, Utah)

CAN Transceiver: MCP2551 (Microchip Technology Incorporated, Chandler, Ariz.)

Display Driver: ICM7228 (Maxim Integrated Products, Inc., Sunnyvale, Calif.)

Voltage Regulator: 78M05

Clock oscillator: 20 MHz crystal

Receiver Circuit

Microprocessor: PIC18F2455 (Microchip Technology Incorporated, Chandler, Ariz.)

Receiver: Xbee (Maxstream, Inc., Lindon, Utah)

Amplifier: MCP6002 (Microchip Technology Incorporated, Chandler, Ariz.)

Voltage Regulator: ZXCL330 (Zetex Inc., Hauppauge, N.Y.)

Analyzer Processing

Driveshaft_Torque (foot-pounds) comes from the pressure sensor(s) 32 as a signal representative of the pressure on the U-joint.

Engine Speed (revolutions per minute "rpm") and Vehicle Speed (miles per hour) obtained from the OBD II link to the motor vehicle.

Tailshaft_Speed (rpm)=((Vehicle_Speed (miles per hour)/60)*Rear_Gear_Ratio)/Wheel_Circumference (inches)

Trans_Ratio=Tail shaft_Speed/Engine_Speed

Engine_Torque=Driveshaft_Torque/Trans_Ratio

Engine_Horsepower=(Engine_Torque*Engine_Speed)/5252

The rear gear ratio and wheel circumference values are entered into analyzer processor "firmware" during assembly. In an alternate embodiment, the values can be user programmable such as entry through a data connection to a laptop or other computer, or through an input interface connected to the analyzer.

The present invention accordingly provides a universal joint 12 modified to hold the pressure sensors 32 in communication with the transmitter 36, with a receiver 40 and analyzer 34, which universal joint is readily installed into the drive train 18 either as an OEM component or as an aftermarket product, for determination and display of torque and horsepower. The universal joint is specific to the particular make and model motor vehicle.

In use, acceleration of the motor vehicle applies pressure to the universal joint 12. The input reference voltage 50 passes into the pressure sensor 32. The applied pressure reduces the amount of current that can flow through the pressure sensor. The output voltage thereby indicates the pressure on the universal joint. The transmitter 36 receives the output voltage as a signal, and communicates the signal in a sine wave, such as FM, directly to the receiver 40. The analyzer 34 receives the signal from the receiver, and periodically interrogates the OBD II data bus as to engine speed and motor vehicle speed. The analyzer 34 is configured with an algorithm that uses the transmitted signal, together with the engine speed and motor vehicle speed to determine the value of the torque applied to the universal joint 12. The analyzer processing is set forth above for determining the torque value. Further, the torque value can then used to derive horsepower via the following formula: Torque × Engine Speed/5,252=Horsepower. The results are readily displayed such as on a 7-segment display 60a, 60b showing torque and horsepower, on an LCD screen, or other display device.

It is to be appreciated that the particular gear and/or gear ratio may affect the computations. In one embodiment, the analyzer 34 is selectively accessible by a personal computer or other date entry device for configuring the controller as to the gear and gear ratio. Further, the controller 34 in an alternate embodiment can be configured for display of the real-time torque or horsepower value momentarily displayed, or display an historical determination in sequence, with the current value at a leading position on the display.

The torque determining apparatus 10 is calibrated by mounting the universal joint 12 in a stand with the pressure sensor 32 installed in the journal 20. A torque wrench is used to apply a known load to the journal 20. The input voltage to the pressure sensor 28 is adjusted using the potentiometers 54, 56 so that the output voltage corresponds to a known value associated with that load within the particular range of values.

The controller 34 includes an algorithm to accommodate the multiplier effect of the transmission, so that the determined torque accounts for the ratio of the gearing between the engine and the transmission. For example, a ratio of 2:1 engine-to-transmission ratio indicates that the engine is producing one-half as much torque as the drive shaft is receiving. The pressure is doubled by the gear transmission effect, and the controller accommodates such factors in determining and displaying the torque and horsepower.

In an alternate embodiment, the opposing journals 20, 22 each are machined to define recesses 40 as discussed above and each receives a separate one of the pressure sensors 32. The pressure sensors 32 are connected in series for electrical communication. This embodiment provides a more precise determination of torque as the pressure applied to the universal joint 12 may not be evenly distributed due to wear, bearings positions, journal cap fit, machine tolerances, or other factor. The series connection is additive so the resulting output signal communicated by the transmitter reflects the loading carried by the universal joint 12.

As discussed above with reference to FIGS. 2 and 4, the torque determining and display apparatus 10 includes a pressure sensing portion and an analyzer portion. The pressure sensing portion includes the pressure transducers 32 sensing pressure applied to the journals 20, 22 during rotation of the drive train 18 and the transmitter 36 for communicating the signal representing the pressures. The analyzer portion includes the receiver 40 that receives the pressure signal and the analyzer 34 that collects pressure, engine speed, and vehicle speed information and computes the torque and horsepower for display.

While this invention has been described in detail with particular references to illustrated embodiments thereof, it should be understood that many modifications, additions and deletions, in additions to those expressly recited, may be made thereto without departure from the spirit and scope of the invention as set forth in the appended claims.

What is claimed is:

1. A torque transfer and measuring apparatus that installs in a drive train of a motor vehicle, comprising:

a universal joint adapted for interconnecting adjacent elongated members of a drive shaft of a motor vehicle and having at least a first journal and an opposing second journal;

a pressure sensor attached to the first journal to sense pressure applied to the first journal during rotational operation of the drive shaft;

an analyzer configured to receive a signal representative of the pressure sensed by the pressure sensor, an rpm signal representative of the speed of the engine, and a speed signal representative of the speed of the vehicle and to determine a torque value representative of a torque of the engine; and a display device that displays the determined torque value.

2. The torque transfer and measuring apparatus as recited in claim 1, wherein the controller is further configured to determine a horsepower value representative of the horsepower of the engine, which horsepower value is displayed on the display device.

3. The torque transfer and measuring apparatus as recited in claim 1, further comprising a transmitter that communicates a first signal from the pressure sensor representative of the pressure applied to the first journal; and a receiver that receives the first signal from the transmitter and provides the first signal to the analyzer.

4. The torque transfer and measuring apparatus as recited in claim 3, wherein the universal joint has a third journal and an opposing fourth journal; and further comprising:
- a second pressure sensor attached to the third journal to sense pressure applied to the third journal during rotational operation of the drive shaft; and wherein:
- the transmitter communicates a second signal from the second pressure sensor representative of the pressure applied to the third journal;
- the receiver further receives the second signal from the transmitter;
- the analyzer further configured to receive the second signal from the receiver and to determine the torque value using the first and second signals.

5. The torque transfer and measuring apparatus as recited in claim 1, wherein the analyzer is configured to query a data buss of the motor vehicle for obtaining the rpm signal and the speed signal.

6. The torque transfer and measuring apparatus as recited in claim 1, wherein the journal defines a recess that receives the pressure sensor.

7. The torque transfer and measuring apparatus as recited in claim 5, further comprising an outer shim received in overlaying relation to the first journal.

8. The torque transfer and measuring apparatus as recited in claim 7, wherein the outer shim defines a window in a side wall thereof that aligns with the pressure sensor.

9. The torque transfer and measuring apparatus as recited in claim 3, further comprising a casing attached to a drive shaft for enclosing transmitter circuitry and power supply.

10. A torque transfer and measuring apparatus that installs in a drive train of a motor vehicle, comprising:
- a universal joint adapted for interconnecting adjacent elongated members of a drive shaft of a motor vehicle and having at least a first journal and an opposing second journal;
- a first pressure sensor attached to the first journal and a second pressure sensor attached to the second journal to sense pressure applied thereto during rotational operation of the drive shaft;
- a transmitter that communicates a first signal from the first pressure sensor representative of the pressure applied to the first journal and from the second pressure sensor representative of the pressure applied to the second journal;
- a receiver that receives the first signal and the second signal from the transmitter;
- an analyzer configured to receive the first signal and the second signal from the receiver, an rpm signal representative of the speed of the engine, and a speed signal representative of the speed of the vehicle, and to determine a torque value representative of a torque of the engine; and
- a display device that displays the determined torque value.

11. The torque transfer and measuring apparatus as recited in claim 10, wherein the controller is further configured to determine a horsepower value representative of the horsepower of the engine, which horsepower value is displayed on the display device.

12. The torque transfer and measuring apparatus as recited in claim 10, wherein the analyzer is configured to query a data bus of the motor vehicle for obtaining the rpm signal and the speed signal.

13. The torque transfer and measuring apparatus as recited in claim 10, wherein the journal defines a recess that receives the pressure sensor.

14. The torque transfer and measuring apparatus as recited in claim 10, further comprising a casing attached to a drive shaft for enclosing transmitter circuitry and power supply.

15. A method of determining torque of a motor vehicle, comprising the steps of:
- (a) attaching a pressure sensor to at least one journal of a universal joint adapted for interconnecting adjacent elongated members of a drive shaft of a motor;
- (b) communicating a signal to an analyzer representative of a pressure sensed by a pressure sensor during rotational operation of the drive shaft;
- (c) communicating to the analyzer an rpm signal representative of the speed of the engine and a speed signal representative of the speed of the vehicle;
- (d) determining a torque value representative of a torque of the engine; and
- (e) displaying the determined torque value.

16. The method as recited in claim 15, further comprising the step of determining horsepower of the motor vehicle and displaying the determined value.

17. The method as recited in claim 15, wherein step (b) the signal communicates to the analyzer by a transmitter connected to the pressure sensor sending a signal representative of the pressure to a receiver that connect to the analyzer.

18. The method as recited in claim 15, wherein the rpm signal and the speed signal communicate to the analyzer in response to a query to a motor vehicle information bus.

\* \* \* \* \*